United States Patent
Song et al.

(10) Patent No.: US 10,269,111 B2
(45) Date of Patent: Apr. 23, 2019

(54) METHOD OF INSPECTING SEMICONDUCTOR WAFER, AN INSPECTION SYSTEM FOR PERFORMING THE SAME, AND A METHOD OF FABRICATING SEMICONDUCTOR DEVICE USING THE SAME

(71) Applicant: SAMSUNG ELECTRONICS CO., LTD., Suwon-si, Gyeonggi-do (KR)

(72) Inventors: Joonseo Song, Seoul (KR); Sung Yoon Ryu, Suwon-si (KR); Wahseng Yap, Seoul (KR); Yunjung Jee, Seongnam-si (KR); Yusin Yang, Seoul (KR); Chungsam Jun, Suwon-si (KR); Yoo Jin Jeoung, Suwon-si (KR); Jaehyung Ahn, Suwon-si (KR); Janghee Lee, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 7 days.

(21) Appl. No.: 15/597,262

(22) Filed: May 17, 2017

(65) Prior Publication Data
US 2018/0053292 A1 Feb. 22, 2018

(30) Foreign Application Priority Data

Aug. 17, 2016 (KR) .................. 10-2016-0104472

(51) Int. Cl.
*G06T 7/00* (2017.01)

(52) U.S. Cl.
CPC .... *G06T 7/001* (2013.01); *G06T 2207/30148* (2013.01)

(58) Field of Classification Search
CPC ................. G06T 7/001; G06T 2207/30148
See application file for complete search history.

(56) References Cited

U.S. PATENT DOCUMENTS

| 8,111,900 B2 | 2/2012 | Wu et al. |
| 8,665,430 B2 | 3/2014 | Okamoto |
| 8,923,600 B2 | 12/2014 | Zafar et al. |

(Continued)

FOREIGN PATENT DOCUMENTS

| KR | 1020080102648 | 11/2008 |
| KR | 100919802 | 10/2009 |

(Continued)

*Primary Examiner* — Ruiping Li
(74) *Attorney, Agent, or Firm* — F. Chau & Associates, LLC (57) ABSTRACT

A method of inspecting a semiconductor wafer is provided, the method includes scanning a plurality of inspection swaths on a wafer to obtain a plurality of image sets and producing a plurality of reference images from the plurality of image sets, respectively. The method of inspecting a semiconductor wafer further includes selecting a plurality of target images from the plurality of image sets, respectively. The method of inspecting a semiconductor wafer additionally includes comparing each reference image of the plurality of reference images with each target image of the plurality of target images to detect a defect image from each of the plurality of target images. A reference image being compared and a target image being compared are images scanned from the same inspection swath.

19 Claims, 8 Drawing Sheets

(56) References Cited

U.S. PATENT DOCUMENTS

| | | |
|---|---|---|
| 9,355,208 B2 | 5/2016 | Shifrin et al. |
| 2008/0063258 A1* | 3/2008 | Kimba ............. G01N 21/95607 382/149 |
| 2008/0072207 A1* | 3/2008 | Verma ....................... G03F 1/84 716/52 |
| 2016/0085155 A1 | 3/2016 | Jung et al. |

FOREIGN PATENT DOCUMENTS

| | | |
|---|---|---|
| KR | 1020140029464 | 3/2014 |
| KR | 1020160034131 | 3/2016 |

* cited by examiner

METHOD OF INSPECTING SEMICONDUCTOR WAFER, AN INSPECTION SYSTEM FOR PERFORMING THE SAME, AND A METHOD OF FABRICATING SEMICONDUCTOR DEVICE USING THE SAME

CROSS-REFERENCE TO RELATED APPLICATION

This U.S. nonprovisional patent application claims priority under 35 U.S.C. § 119 to Korean Patent Application 10-2016-0104472 filed on Aug. 17, 2016 in the Korean Intellectual Property Office, the disclosure of which is incorporated by reference herein in its entirety.

TECHNICAL FIELD

One or more exemplary embodiments of the present inventive concept relate to a method of inspecting a semiconductor wafer, an inspection system for performing the method of inspecting a semiconductor wafer, and a method of fabricating a semiconductor device using the inspection system for performing the method of inspecting a semiconductor wafer.

DISCUSSION OF THE RELATED ART

A photomask may be used to print an integrated circuit layout onto a wafer during a photolithography process for fabricating a semiconductor device. The photolithography process may generally involve transferring mask patterns formed on the photomask onto the wafer by using optic lenses. Further, as semiconductor devices become smaller, distances between each mask pattern of the photomask, for fabricating semiconductor devices, may decrease. The smaller distances between mask patterns may cause interference and diffraction of light, and thus, the wafer may be printed with a layout that may be different from a desired layout.

SUMMARY

Exemplary embodiments of the present inventive concept provide an inspection method and a system for detecting defects of a wafer.

Exemplary embodiments of the present inventive concept provide a method of fabricating a semiconductor device for minimizing an occurrence of a defect.

According to an exemplary embodiment of the present inventive concept, a method of inspecting a semiconductor wafer is provided, the method includes scanning a plurality of inspection swaths on a wafer to obtain a plurality of image sets and producing a plurality of reference images from the plurality of image sets, respectively. The method of inspecting a semiconductor wafer further includes selecting a plurality of target images from the plurality of image sets, respectively. The method of inspecting a semiconductor wafer additionally includes comparing each reference image of the plurality of reference images with each target image of the plurality of target images to detect a defect image from each of the plurality of target images. A reference image being compared and a target image being compared are images scanned from the same inspection swath.

According to an exemplary embodiment of the present inventive concept, an inspection system is provided, includes an inspection apparatus that scans a plurality of inspection swaths on a wafer and produces a plurality of image sets each of which is produced from each inspection swath of the plurality of inspection swaths. The inspection apparatus further includes a computer that obtains the plurality of image sets from the inspection apparatus and produces a plurality of reference images from the plurality of image sets, respectively. The plurality of inspection swaths may be scanned in an x-axis direction and scanned at different positions arranged along a y-axis direction. The y-axis direction crosses the x-axis direction.

According to an exemplary embodiment of the present inventive concept, a method of fabricating a semiconductor device is provided, the method includes loading, on a stage of an inspection apparatus, a test wafer including dies that are each formed under different photolithography conditions, and using the inspection apparatus to obtain a plurality of image sets by scanning a plurality of inspection swaths on the test wafer. The method further includes using a computer combined with the inspection apparatus to respectively produce a plurality of reference images from the plurality of image sets, to respectively select a plurality of target images from the plurality of image sets, to compare each reference image of the plurality of reference images with each target image of the plurality of target images, and to detect a defect from each of the plurality of target images. The method additionally includes unloading the test wafer from the stage of the inspection apparatus, and performing a photolithography process for forming a semiconductor integrated circuit on a substrate under a photolithography condition that is selected by using information on the detected defect.

BRIEF DESCRIPTION OF THE DRAWINGS

The above and other features of the inventive concept will become more apparent by describing in detail exemplary embodiments thereof, with reference to the accompanying drawings, in which.

DETAILED DESCRIPTION OF EMBODIMENTS

Exemplary embodiments of the present inventive concept will be described in more detail below with reference to the accompanying drawings, in which exemplary embodiments of the preset inventive concept are shown.

Figure 1:
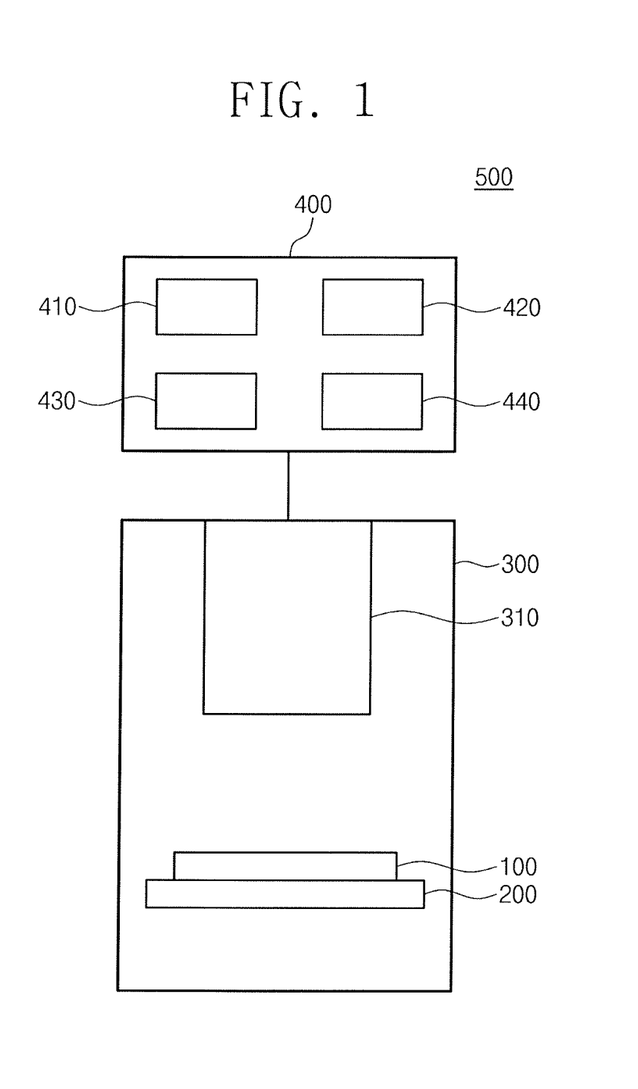
FIG. 1 is a schematic diagram illustrating an inspection system according to an exemplary embodiment of the present inventive concept.

FIG. 1 is a schematic diagram illustrating an inspection system according to an exemplary embodiment of the present inventive concept.

Referring to FIG. 1, an inspection system 500 may include an inspection apparatus 300, which scans a wafer 100 to produce image data of patterns formed on the wafer 100. The inspection system 500 may further include a computer 400, which stores and processes the image data obtained from the inspection apparatus 300. The inspection apparatus 300 may include a stage 200 on which the wafer 100 may be loaded (e.g., disposed) and a detector 310 transmitting the produced image data to the computer 400. The inspection apparatus 300 may be an apparatus used for performing non-destructive testing. The computer 400 is connected to the inspection apparatus 300. For example, the computer 400 may be connected to the detector 310 of the inspection apparatus 300.

The computer 400 may be configured to process the image data transmitted from the detector 310. For example, the computer 400 may include a data processor 410 to process various data and a library 420 to store the various data. The library 420 may include a hard disk and/or a nonvolatile semiconductor memory device (e.g., a flash memory device, a phase change memory device, and/or a magnetic memory device). Functions of the data processor 410 and the library 420 will be described later. The computer 400 may include an input/output 430 and an interface 440. The input/output 430 may include, for example, a keyboard, a keypad, and/or a display device. The computer 400 may receive the image data transmitted from the detector 310 through the interface 440. The detector 310 may receive processed image data from the computer 400 through the interface 440. The interface 440 may include, for example, a wired element, a wireless element, and/or a universal serial bus (USB) port. A data bus may be provided to connect the data processor 410, the library 420, the input/output 430, and the interface 440 to one another.

Hereinafter, it will be described about a method of inspecting a semiconductor wafer using the inspection system 500.

Figure 2:
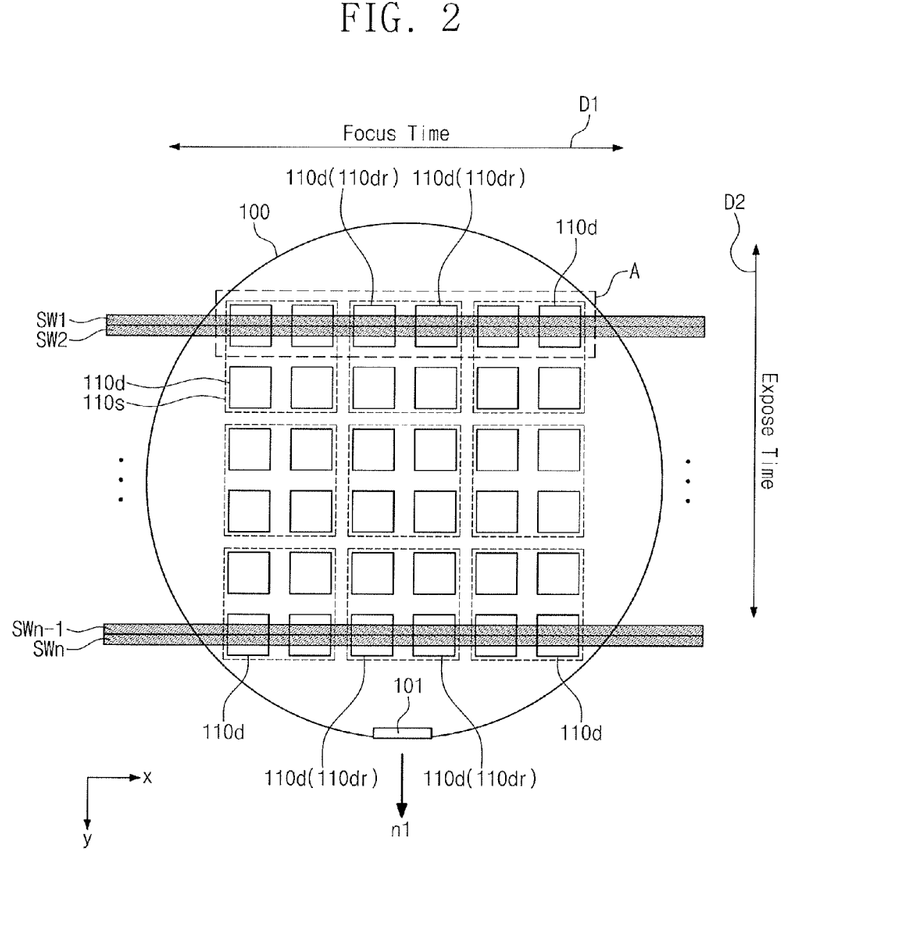
FIGS. 2 and 3 show a method of inspecting a semiconductor wafer according to an exemplary embodiment of the present inventive concept.
Figure 3:
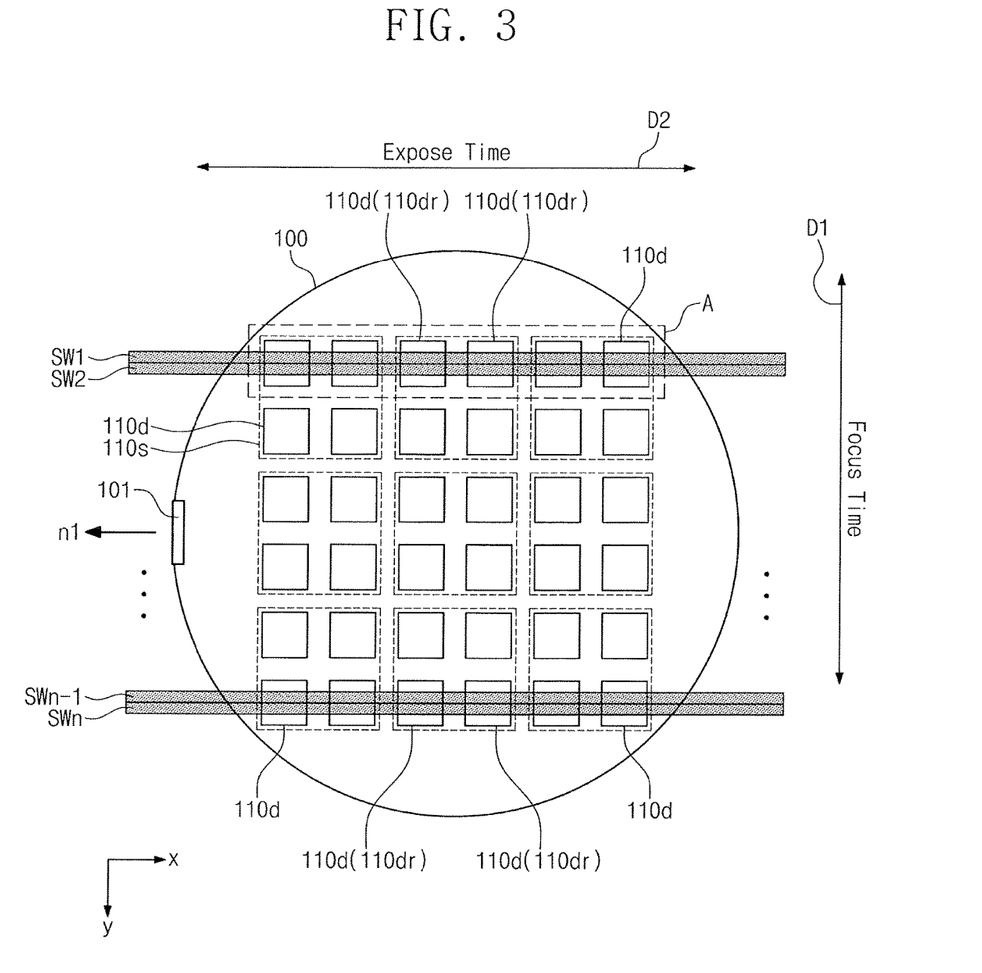
Figure 4:
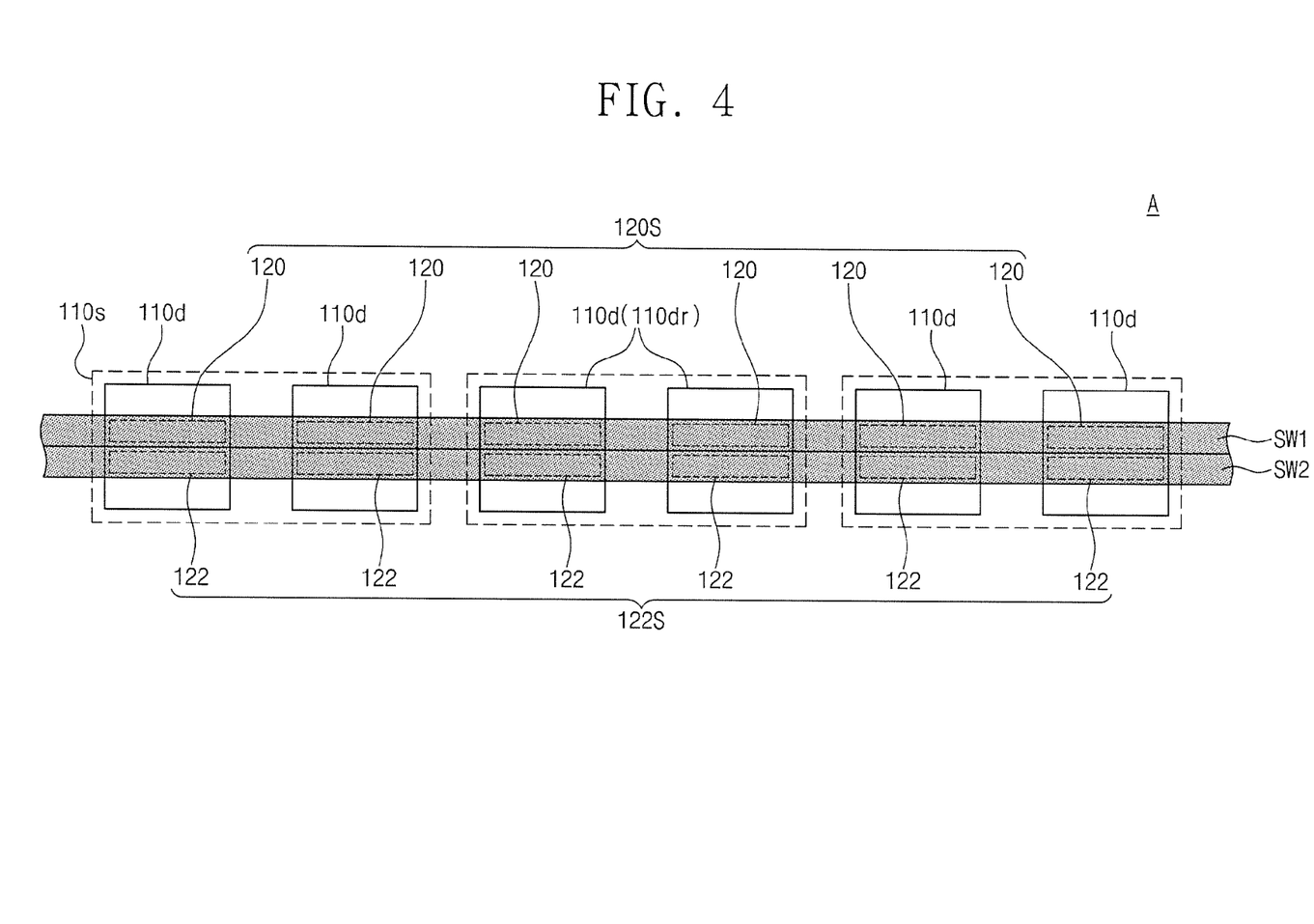
FIG. 4 shows section A of each of FIGS. 2 and 3.

FIGS. 2 and 3 show a method of inspecting a semiconductor wafer according to an exemplary embodiment of the present inventive concept, and FIG. 4 shows section A of each of FIGS. 2 and 3.

Referring to FIGS. 1 and 2, a wafer 100 may be prepared. The wafer 100 may include a plurality of dies 110d (e.g., a plurality of semiconductor chips). Each die 110d of the plurality of dies 110d may include pattern layouts, which may be designed substantially identical to one another. Each of the plurality of dies 110d may be formed under different photolithography conditions. In an exemplary embodiment of the present inventive concept, adjacent dies 110d of the plurality of dies 110d may be combined to constitute a group 110s (referred to hereinafter as a shot), and the adjacent dies 110d included in the shot 110s may be formed under substantially the same photolithography condition. When a plurality of shots 110s are defined on the wafer 110, each shot 110s of the plurality of shots 110s may be formed under different photolithography conditions. As shown in FIG. 2, the number of the adjacent dies 110d included in a single shot 110s may be four, but exemplary embodiments of the preset inventive concept are not limited thereto.

In an exemplary embodiment of the present inventive concept, each of the dies 110d arranged along a first direction D1 may be formed under different focus conditions (e.g., different focus times), and each of the dies 110d arranged along a second direction D2 perpendicular to the first direction D1 may be formed under different exposure conditions (e.g., different exposure times). When the plurality of shots 110s are defined on the wafer 100, each of the shots 110s arranged along the first direction D1 may be formed under different focus conditions (e.g., different focus times), and each of the shots 110s arranged along the second direction D2 may be formed under different exposure conditions (e.g., different exposure times). In this case, the dies 110d included in each of the plurality of shots 110s may be formed under substantially the same focus and exposure conditions. The wafer 100 may be, for example, a FEM (Focus Exposure Matrix) test wafer.

The wafer 100 may be loaded (e.g., disposed) on the stage 200 of the inspection apparatus 300. The wafer 100 may include a notch 101 formed at its edge, and the wafer 100 may be disposed (or, e.g., aligned) on the stage 200 so that the notch 101 may face one direction n1.

For example, the wafer 100 may be disposed on the stage 200 so that the notch 101 may face a y-axis direction (e.g., the one direction n1 may be the same as the y-axis direction). In this case, the first direction D1 may be parallel to an x-axis direction, and the second direction D2 may be parallel to the y-axis direction. In other words, the wafer 100 may be disposed on the stage 200 so that the first direction D1 may be parallel to the x-axis direction.

The inspection apparatus 300 may scan a plurality of inspection swaths SW1 to SWn (n is a positive integer) on the wafer 100. An inspection swath (e.g., SW1 to SWn) may indicate a range (or, e.g., a strip in along the x-axis direction) scanned by the inspection apparatus 300 along one direction (e.g., the x-axis direction or the y-axis direction). Each of the plurality of inspection swaths SW1 to SWn may be scanned to cross the plurality of dies 110d arranged along the x-axis direction (e.g., the dies 110d arranged along the first direction D1). The plurality of inspection swaths SW1 to SWn may each be scanned on the wafer 100 at different positions. The positioning of the scanning may be arranged along the y-axis direction. For example, the second inspection swath SW2 may be scanned below (in the y-axis direction) the first inspection swath SW1 scanned, as illustrated in FIG. 2. The inspection apparatus 300 may produce a first image data by scanning the plurality of inspection swaths SW1 to SWn on the wafer 100. The first image data may include a plurality of image sets produced respectively from the plurality of inspection swaths SW1 to SWn. Each of the plurality of image sets may include images of portions of the dies 110d arranged along the first direction D1. The portions of the dies 110d corresponding to the images of an image set may be scanned along each of the plurality of inspection swaths SW1 to SWn.

Referring to FIGS. 2 and 4, a first image set 120S may be produced when the wafer 100 is scanned along a first inspection swath SW1 of the plurality of inspection swaths SW1 to SWn. The first inspection swath SW1 may be scanned, which may extend across a plurality of dies 110d arranged along the x-axis direction (e.g., the dies 110d arranged along the first direction D1). The first image set 120S may include images 120 of portions of the dies 110d arranged along the first direction D1. A second image set 122S may be produced when the wafer 100 is scanned along a second inspection swath SW2 of the plurality of inspection swaths SW1 to SWn. For example, the first and second inspection swaths SW1 and SW2 may be scanned to cross the dies 110d arranged along the first direction D1. The second inspection swath SW2 may be scanned across the plurality of dies 110d (e.g., the dies 110d arranged along the first direction D1) along the x-axis direction (or, e.g., a negative x-axis direction). The first and second inspection swaths SW1 and SW2 may each be scanned at different positions arranged along the y-axis direction. For example, the first inspection swath SW1 may be scanned across portions of the plurality of dies 110d and the second inspection swath SW2 may be scanned across different portions of the plurality of dies 110d. In this case, the second image set 122S may include images 122 of other portions of the dies 110d arranged along the first direction D1. In addition, an image set may be produced from each of the plurality of inspection swaths SW1 to SWn that are scanned by the inspection apparatus 300. The first image data may be defined to include a plurality of image sets each of which is produced from scanning each of the plurality of inspection swaths SW1 to SWn.

Referring to FIGS. 1 and 3, after the first image data is produced, the wafer 100 may be rotated to be positioned on the stage 200 so that the notch 101 faces a direction along the x-axis direction (e.g., the one direction n1 may be the same as the negative x-axis direction). In this case, the second direction D2 may be parallel to the x-axis direction, and the first direction D1 may be parallel to the y-axis direction. For example, the wafer 100 may be disposed on the stage 200 to arrange the second direction D2 parallel to the x-axis direction. The inspection apparatus 300 may scan the plurality of inspection swaths SW1 to SWn on the wafer 100. Each of the plurality of inspection swaths SW1 to SWn may be scanned across the plurality of dies 110d arranged along the x-axis direction (e.g., the plurality of dies 110d arrange along the second direction D2). Further, the plurality of inspection swaths SW1 to SWn may be scanned at different positions arranged along the y-axis direction. The inspection apparatus 300 may produce a second image data by scanning the plurality of inspection swaths SW1 to SWn on the wafer 100. The second image data may include a plurality of image sets each of which is produced from each of the plurality of inspection swaths SW1 to SWn that are scanned by the inspection apparatus 300. Each of the plurality of image sets may include images of portions of the dies 110d arranged along the second direction D2. Portions of the dies 110d may be scanned along each of the plurality of inspection swaths SW1 to SWn. The plurality of image sets in the second image data may be produced by a method substantially the same as that used to produce the plurality of image sets in the first image data discussed with reference to FIGS. 2 and 4. Referring to FIGS. 3 and 4, each of the plurality of image sets in the second image data may include images of portions of the dies 110d arranged along the second direction D2.

The computer 400 may receive the first and second image data produced from the inspection apparatus 300 via the detector 310.

Figure 5:
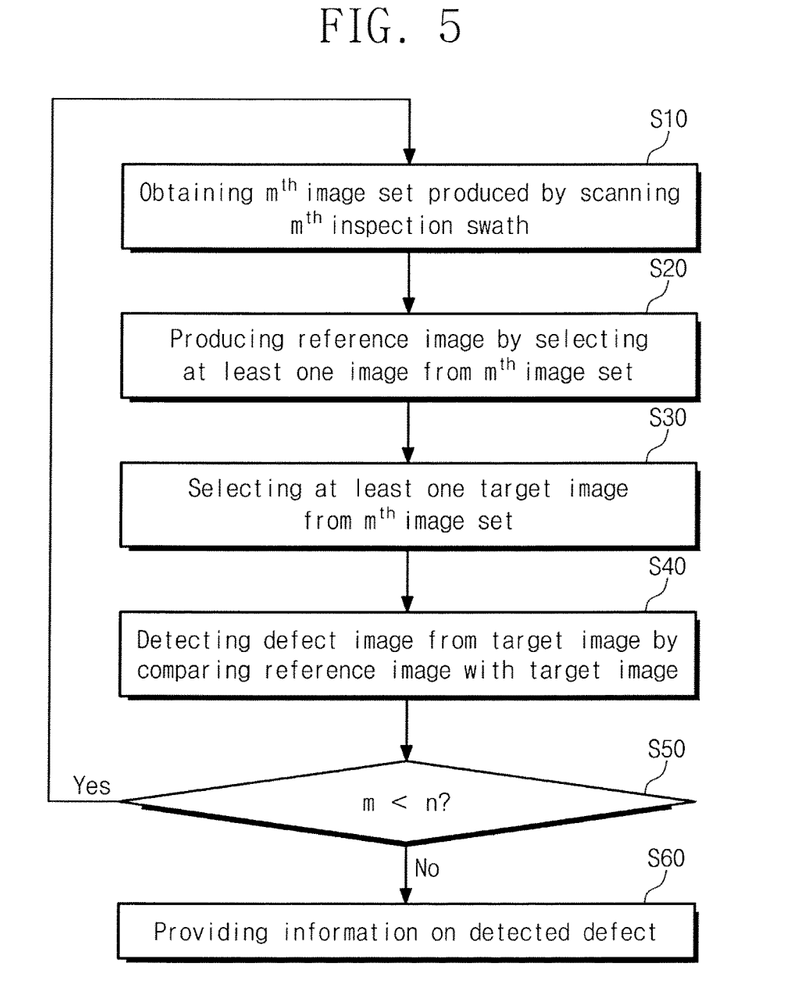
FIG. 5 is a flow chart of a method of inspecting a semiconductor wafer according to an exemplary embodiment of the present inventive concept.
Figure 6:
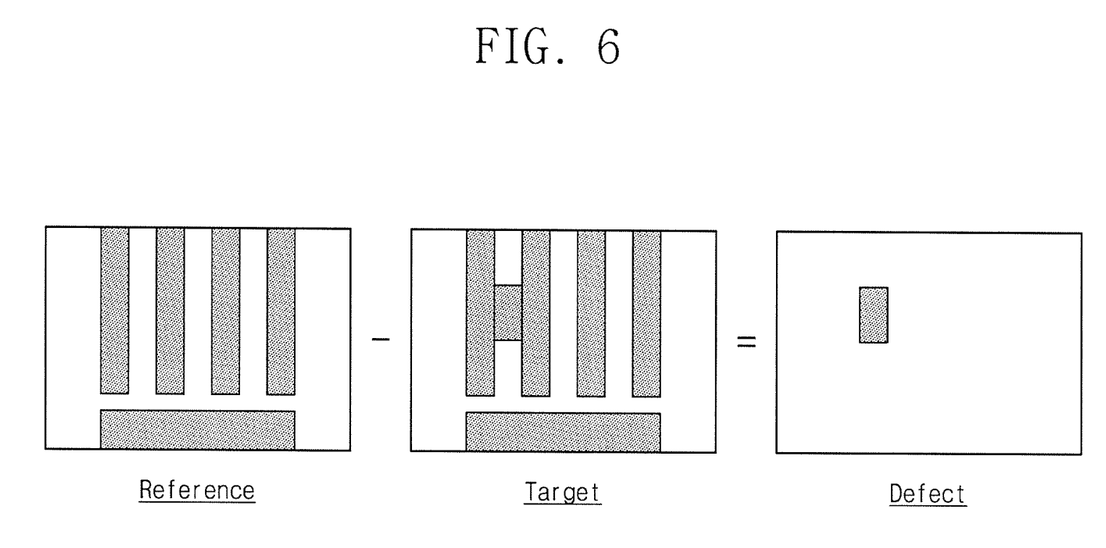
FIG. 6 shows details of step S40 shown in FIG. 5.

FIG. 5 is a flow chart of a method of inspecting a semiconductor wafer according to an exemplary embodiment of the present inventive concept. FIG. 6 shows details of step S40 shown in FIG. 5.

Referring to FIGS. 2, 3 and 5, an $m^{th}$ image set produced by scanning an $m^{th}$ inspection swath may be obtained (S10). Herein, m is a positive integer. For example, the first image set 120S may be obtained when the first inspection swath SW1 is scanned. The data processor 410 of the computer 400 may acquire the first image set 120S through the detector 310. For example, as discussed with reference to FIGS. 2 and 4, the first inspection swath SW1 may be scanned across the dies 110d arranged along the first direction D1 (e.g., each of the dies 110d may be formed under different focus conditions). Thus, the first image set 120S may be produced to include the images 120 of the portions of the dies 110d arranged along the first direction D1 and that are scanned (e.g., each of the dies 110d may be formed under different focus conditions). In addition, as discussed with reference to FIGS. 3 and 4, the first inspection swath SW1 may be scanned across the dies 110d arranged along the second direction D2 (e.g., each of the dies 110d may be formed under different exposure conditions). Thus, first image set 120S may thus be produced to include the images 120 of the portions of the dies 110d arranged along the second direction D2 and that are scanned (e.g., each of the dies 110d may be formed under different exposure conditions). At least one of the formed dies 110d (e.g., the dies 110d may be formed under the different focus or the different exposure conditions) may be a pre-selected reference die 110dr.

Referring to FIGS. 4 and 5, a reference image may be produced by selecting at least one image from the $m^{th}$ image set (S20). For example, a reference image may be produced by selecting at least one image 120 from the first image set 120S. For example, when one of the formed dies 110d is a pre-selected reference die 110dr, the production of the reference image may include selecting an image 120 of the reference die 110dr from the first image set 120S. In addition, when some of the formed dies 110d are a plurality of pre-selected reference dies 110dr, the production of the reference image may include selecting images 120 of the plurality of reference dies 110dr from the first image set 120S and producing a median image of the images 120 of the plurality of reference dies 110dr. For example, the plurality of pre-selected reference dies 110dr corresponding to the first image set 120S may be located in substantially a middle of the dies 110d. Further, the median image may be produced by, for example, combining the images of the plurality of reference dies 110dr that may be formed in substantially the middle of the dies 110d. The median image may be an image where defects and/or noises might not be present in the images 120 of the plurality of reference dies 110dr.

At least one target image may be selected from the $m^{th}$ image set (S30). For example, after the reference image is produced, at least one target image may be selected from the first image set 120S. The target image may be one of the images 120 of the formed dies 110d. In an exemplary embodiment of the present inventive concept, each of the images 120 of the formed dies 110d may be selected to be the target image.

A defect image (or, e.g., a defect) may be detected from the target image by comparing the reference image with the target image (S40). The detection of the defect image from the target image may include performing an image subtraction analysis on the reference and target images. For example, referring to FIG. 6, the defect image (designated by Defect) may be a differential image obtained from the comparison between the reference image (designated by Reference) produced at the step S20 of FIG. 5 and the target image (designated by Target) selected at the step S30 of FIG. 5. For example, the defect image (or, e.g., defect) may be a difference between the reference image being compared and the target image being compared.

When a plurality of target images are selected from the $m^{th}$ image set, defect images may be detected from the plurality of target images, respectively, by comparing each of the plurality of target images with the reference image. The defect images in the plurality of target images may be a differential image obtained from a comparison of differences between the reference image and each of the plurality of target images. Thus, the defect images in the $m^{th}$ image set may be detected.

Referring back to FIGS. 2, 3 and 5, when the plurality of inspection swathes SW1 to SWn are scanned on the wafer 100, it may be determined whether or not m is less than n after detecting the defect images in the $m^{th}$ image set (S50).

For example, whether some inspection swaths of the plurality of inspections swaths SW1 to SWn have not been scanned.

If m is determined to be less than n, a next step may be returning back to the step S10. For example, referring back to FIG. 4, after the defect images in the first image set 120S are detected, the data processor 410 may obtain, through the detector 310, the second image set 122S by scanning the second inspection swath SW2. For example, as discussed with reference to FIGS. 2 and 4, the second inspection swath SW2 may be scanned across the dies 110d arranged along the first direction D1 (e.g., the dies 110d formed under different focus conditions from one another), and thus the second image set 122S may be produced to include the images 122 of the portions of the dies 110d arranged along the first direction D1 (e.g., the dies 110d formed under different focus conditions from one another). In addition, as discussed with reference to FIGS. 3 and 4, the second inspection swath SW2 may be scanned across the dies 110d arranged along the second direction D2 (e.g., the dies 110d formed under different exposure conditions from one another), and thus the second image set 122S may be produced to include the images 122 of the portions of the dies 110d arranged along the first direction D2 (e.g., the dies 110d formed under different exposure conditions from one another). At least one of the formed dies 110d (e.g., the dies formed under the different focus or the different exposure conditions from one another) may be a pre-selected reference die 110dr.

Subsequently, the data processor 410 may produce a reference image by selecting at least one image 122 from the second images set 122S (S20), may select at least one target image from the second image set 122S (S30), and may detect a defect image from the target image by comparing the reference image with the target image (S40). Further, the data processor 410 may obtain an image set from each of the plurality of inspection swaths SW1 to SWn (S10), may produce a reference image by selecting at least one image from the image set produced from each of the inspection swaths SW1 to SWn (S20), may select at least one target image from the image set produced from each of the plurality of inspection swaths SW1 to SWn (S30), and may detect a defect image in the target image by comparing the reference image with the target image (S40). Therefore, a defect image may be detected in the image set of each of the plurality of inspection swaths SW1 to SWn.

Information on defects detected from the wafer 100 may be provided. As discussed with reference to FIG. 2, when each of the plurality of inspection swaths SW1 to SWn is scanned across the dies 110d arranged along the first direction D1 (e.g., the dies 110d formed under different focus conditions from one another), information obtained from the scanning may be information on defects that may have occurred with a particular focus condition. As discussed with reference to FIG. 3, when each of the plurality of inspection swaths SW1 to SWn is scanned across the dies 110d arranged along the second direction D2 (e.g., the dies 110d formed under different exposure conditions from one another), information obtained from the scanning may be information on defects that may have occurred with a particular exposure condition.

Figure 7:
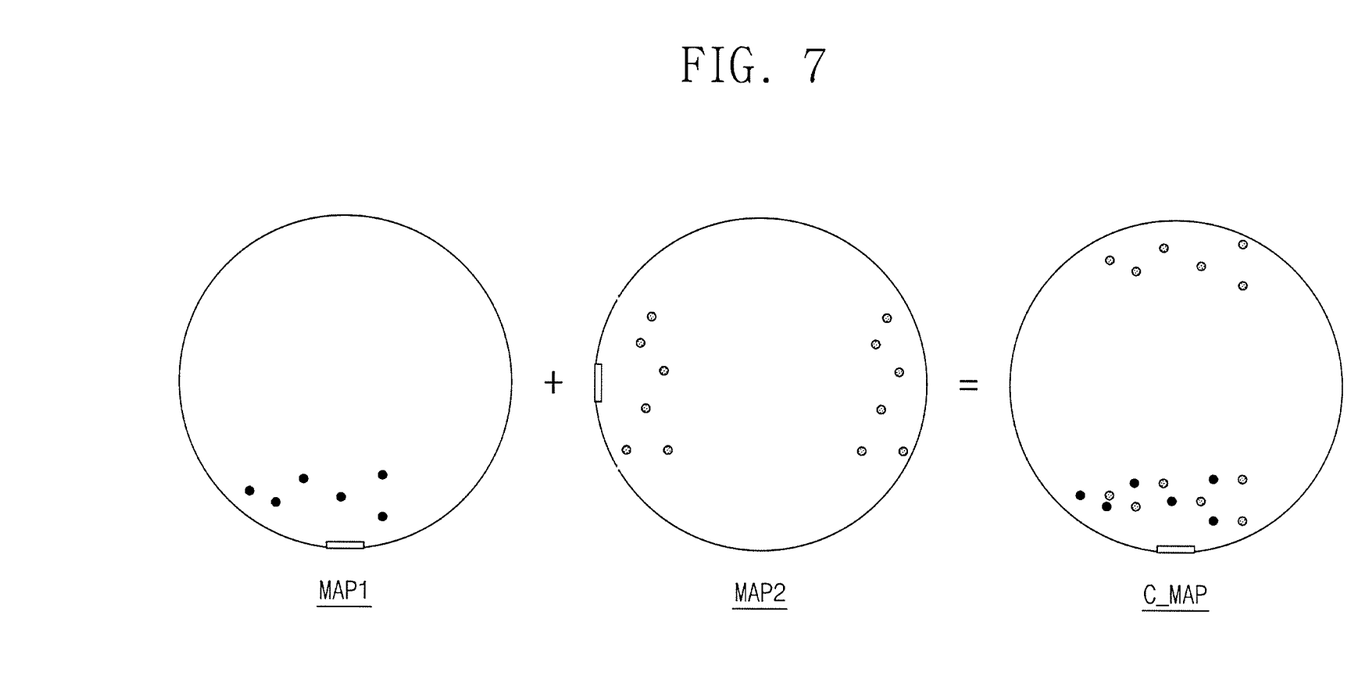
FIG. 7 shows an example of information provided at step S60 shown in FIG. 5.

FIG. 7 shows an example of information provided at step S60 shown in FIG. 5.

Referring to FIG. 7, when each of the plurality of inspection swaths SW1 to SWn is scanned across the dies 110d arranged along the first direction D1 (e.g., the dies 110d formed under different focus conditions from one another) as shown in FIG. 2, the data processor 410 of the computer 400 may provide a first map MAP1 including information on defects that may have occurred with a particular focus condition. The first map MAP1 may include dots indicating regions where the defects occurred on the wafer 100. When each of the plurality of inspection swaths SW1 to SWn is scanned across the dies 110d arranged along the second direction D2 (e.g., the dies 110d formed under different exposure conditions from one another) as shown in FIG. 3, the data processor 410 of the computer 400 may provide a second map MAP2 including information on defects that may have occurred with a particular exposure condition. The second map MAP2 may include dots indicating regions where the defects occurred on the wafer 100. The data processor 410 may combine the first and second maps MAP1 and MAP2 to provide a combined map C_MAP including the information on the defects occurred with particular focus and exposure conditions. The combined map C_MAP may provide the information on the defects occurred in the dies 110d that are split on the wafer 100 in accordance with different focus and exposure conditions.

To inspect a wafer 100 including dies 110d that are split in accordance with photolithography conditions different from one another, an inspection apparatus 300 may scan a plurality of inspection swaths SW1 to SWn on the wafer 100 to produce, respectively, a plurality of image sets from the plurality of inspection swaths SW1 to SWn. Each of the plurality of image sets may include images of a plurality of dies 110d arranged along a scanning direction (e.g. an x-axis direction) of each of the plurality of inspection swaths SW1 to SWn. To detect defects that may have occurred on the wafer 100, a computer 400 connected to the inspection apparatus 300 may compare a reference image of a pre-selected reference die 110dr in the wafer 100 with each of target images of the plurality of dies 110d in an image set 120S and 122S, and each of the target images is produced from each of the plurality of inspection swaths SW1 to SWn. When the pre-selected reference die 110dr corresponds to at least one die 110d positioned on a center of the wafer 300, a large distance may be established between the pre-selected reference die 110dr and each of the plurality of dies (e.g., the dies other than the pre-selected reference die 110dr) such that the reference image might not properly align with each of the target images to compare the reference image with each of the target images.

According to an exemplary embodiment of the present inventive concept, a plurality of inspection swaths SW1 to SWn may be scanned on a wafer 100 to produce, respectively, a plurality of image sets from the plurality of inspection swaths SW1 to SWn and to produce, respectively, a plurality of reference images from the plurality of image sets. A defect image may be detected by comparing a reference image produced from each of the plurality of image sets with a target image selected from each of the plurality of image sets. Further, the target image may be compared with a corresponding reference image produced from the same inspection swath (e.g. SW1) as that from which the target image was selected. As such, an alignment may be achieved between the target and reference images, and a defect in the target image may be detected with minimizing errors by a misalignment between the target and reference images. Therefore, an inspection method and system may be provided to detect defects formed on the wafer 100 with an increased accuracy.

Figure 8:
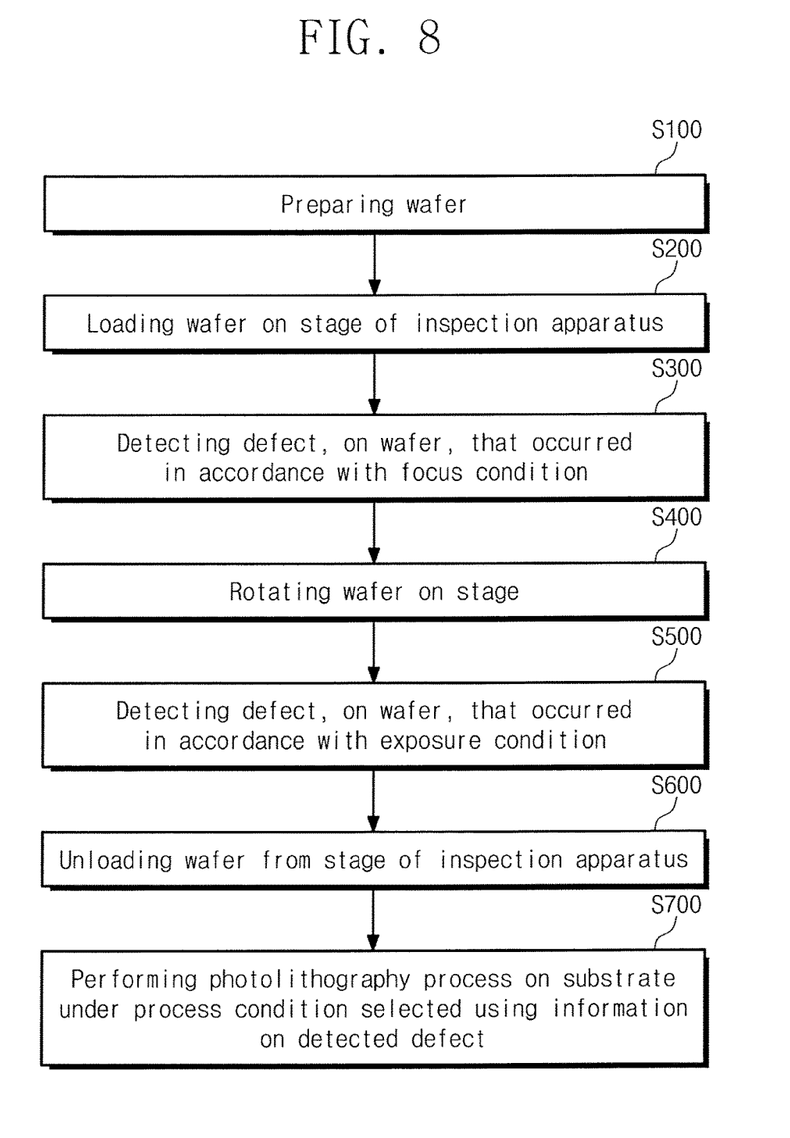
FIG. 8 is a flow chart of a method of manufacturing semiconductor devices using a method of inspecting a semiconductor wafer according to an exemplary embodiment of the present inventive concept.

FIG. 8 is a flow chart of a method of manufacturing semiconductor devices using a method of inspecting a semiconductor wafer according to an exemplary embodiment of the present inventive concept.

Referring to FIGS. 1 and 8, a wafer 100 may be prepared (S100). The wafer 100 may include a plurality of dies 110d as discussed with reference to, e.g., FIGS. 2 and 3. The each of the plurality of dies 110d may include pattern layouts, which may be designed substantially identical to one another. In an exemplary embodiment of the present inventive concept, adjacent dies 110d of the plurality of dies 110d may be combined to constitute a shot 110s, and adjacent dies 110d included in the shot 110s may be formed under substantially the same photolithography condition. When a plurality of shots 110s are defined on the wafer 100, each of the plurality of shots 110s may be formed under different photolithography conditions. As discussed with reference to FIGS. 2 and 3, the number of the adjacent dies 110d included in a single shot 110s may be four, but exemplary embodiments of the preset inventive concept are not limited thereto. In an exemplary embodiment of the present inventive concept, the dies 110d arranged along the first direction D1 may be formed under different focus conditions (e.g., different focus times) from one another, and the dies 110d arranged along the second direction D2 perpendicular to the first direction D1 may be formed under different exposure conditions (e.g., different exposure times) from one another. In this case, for example, the dies 110d included in each of the plurality of shots 110s may be formed under substantially the same focus and exposure conditions. For example, the wafer 100 may be an FEM (Focus Exposure Matrix) test wafer.

The wafer 100 may be disposed on the stage 200 of the inspection apparatus 300 (S200). As discussed with reference to FIG. 2, the wafer 100 may include the notch 101 formed at an edge of the wafer 100, and the wafer 100 may be disposed on the stage 200 so that the notch 101 may face one direction n1. The wafer 100 may be disposed on the stage 200 so that the notch 101 may face the y-axis direction (e.g., n1 direction may be the same as the y-axis direction). In this case, the first direction D1 may be parallel to the x-axis direction, and the second direction D2 may be parallel to the y-axis direction. For example, the wafer 100 may be disposed on the stage 200 so that the first direction D1 may be parallel to the x-axis direction.

The inspection apparatus 300 may be used to detect defects on the wafer 100, which may have occurred in accordance with focus conditions (S300). For example, the inspection apparatus 300 may scan the plurality of inspection swaths SW1 to SWn on the wafer 100 to produce, respectively, the plurality of image sets from the plurality of inspection swaths SW1 to SWn. As discussed with reference to FIGS. 2 and 5, the data processor 410 of the computer 400 may obtain an image set each of which may be produced from the scanning of each of the plurality of inspection swaths SW1 to SW1n by using the detector 310 of the inspection apparatus 300 (S10), may produce a reference image by selecting at least one image from the image set (S20), may select at least one target image from the image set (S30), and may detect a defect image from the target image by comparing the reference image with the target image (S40). Therefore, the data processor 410 of the computer 400 may be provided information relating to defects on the wafer 100, which may have occurred in accordance with focus conditions (S60).

Subsequently, the wafer 100 may be rotated on the stage 200 (S400). As discussed with reference to FIG. 3, the wafer 100 may rotate to lie on the stage 200 so that the notch 101 may face a negative x-axis direction (i.e., the one direction n1 may be the same as the negative x-axis direction). In this case, the second direction D2 may be parallel to the x-axis direction, and the first direction D1 may be parallel to the y-axis direction. For example, the wafer 100 may be disposed on the stage 200 to arrange the second direction D2 parallel to the x-axis direction.

The inspection apparatus 300 may be used to detect defects on the wafer 100, which may occur in accordance with exposure conditions (S500). For example, the inspection apparatus 300 may scan the plurality of inspection swaths SW1 to SWn on the wafer 100 to produce, respectively, a plurality of image sets from the plurality of inspection swaths SW1 to SWn.

As discussed with reference to FIGS. 3 and 5, the data processor 410 of the computer 400 may perform the following operations: obtain an image set 120S or 122S each of which is produced from the scanning of each of the plurality of inspection swaths SW1 to SW1n by using the detector 310 of the inspection apparatus 300 (S10); produce a reference image by selecting at least one image from the image set (S20); select at least one target image from the image set (S30); and detect a defect image from the target image by comparing the reference image with the target image (S40). Therefore, information on defects on the wafer 100 may be provided, which may occur in accordance with, for example, exposure conditions (S60). The wafer 100 may be unloaded from the stage 200 of the inspection apparatus 300 (S600). The data processor 410 of the computer 400 may combine information on defects that may occur in accordance with focus and exposure conditions to provide a combined map C_MAP including the information on the defects that may occur in accordance with focus and exposure conditions, as shown in FIG. 7.

A photolithography process may be performed on a substrate under a process condition that is selected by using the information about the detected defects (S700). For example, the data processor 410 of the computer 400 may provide the information about the defects that may occur in accordance with focus and exposure conditions, and the data processor 410 may select focus and exposure conditions based on the information on the defects. The selected focus and exposure conditions may be, for example, focus and exposure conditions to minimize the occurrence of the defects of the dies 110d among focus and exposure conditions split on the wafer 100. A photolithography process may be performed on the substrate using the focus and exposure conditions that are selected by the data processor 410. The substrate may include a semiconductor substrate (e.g., a silicon substrate) and a photoresist layer formed on the semiconductor substrate. Performing the photolithograph process on the substrate may include providing, on the substrate, a photomask including a layout pattern of semiconductor integrated circuits and carrying out focus and exposure processes on the substrate under the selected focus and exposure conditions. Thus, the photoresist layer may be patterned to form photoresist patterns on the substrate. The photoresist patterns may have shapes required for forming layout patterns of semiconductor integrated circuits on the substrate.

According to an exemplary embodiment of the present inventive concept, when a wafer 100 includes a plurality of dies 110d that are split in accordance with photolithography conditions different from each other, the aforementioned inspection method and system may be used to detect defects that may have occurred on the wafer 100 in accordance with photolithography conditions. Information on defects, which may have occurred in accordance with photolithography conditions, may be used to select a photolithography condition. This may minimize the occurrence of defects from photolithography conditions split on the wafer 100. In this case, the selected photolithography condition may be employed to perform a photolithography process on a substrate suitable for forming a semiconductor integrated circuit, and thus, an occurrence of defects on the substrate may be reduced. As a result, the present inventive concept may provide a method of fabricating a semiconductor device that may minimize the occurrence of defects.

According to exemplary embodiments of the present inventive concept, a plurality of reference images may be respectively produced from a plurality of image sets corresponding to a plurality of inspection swaths SW1 to SWn that are scanned on a wafer 100. A defect may be detected by comparing each reference image produced from each of the plurality of image sets with each target image selected from each of the plurality of image sets. In other words, the target image may be compared with the reference image produced from the same inspection swath (e.g. SW1) as that from which the target image is selected. For this reason, an alignment may be achieved between the target and reference images, and a defect image may be detected from the target image with minimizing errors by a misalignment between the target and reference images. Therefore, an improved method and system for detecting defects formed on the wafer 100 may be provided.

Furthermore, when the wafer 100 includes a plurality of dies 110d each split under different photolithography conditions, defects on the wafer 100 may be detected, which occur in accordance with photolithography conditions. Information on defects that occurred in accordance with photolithography conditions may be used to select a photolithography condition (e.g., a condition to reduce an occurrence of defects) from photolithography conditions split on the wafer 100. Thus, the occurrence of defects may be minimized. In this case, the selected photolithography condition may be employed to perform a photolithography process on a substrate suitable for forming a semiconductor integrated circuit, and thus, an occurrence of defects on the substrate may be reduced. As a result, the present inventive concept may provide a method of fabricating a semiconductor device that may minimize the occurrence of defects.

While the present inventive concept has been shown and described with reference to the exemplary embodiments thereof, it will be apparent to those of ordinary skill in the art that various changes in form and detail may be made thereto without departing from the spirit and scope of the present inventive concept.

What is claimed is:

1. A method of inspecting a semiconductor wafer, the method comprising:
   scanning a plurality of inspection swaths on a wafer to obtain a plurality of image sets, wherein a first inspection swath of the plurality of inspection swaths extending in a first direction is scanned, and a second inspection swath of the plurality of inspection swaths extending in a second direction crossing first direction is scanned;
   producing a plurality of reference images from the plurality of image sets, respectively;
   selecting a plurality of target images from the plurality of image sets, respectively; and
   comparing each reference image of the plurality of reference images with each target image of the plurality of target images to detect a defect image from each of the plurality of target images,
   wherein a reference image being compared and a target image being compared are images scanned from the same inspection swath.

2. The method of claim 1, wherein
   each inspection swath of the plurality of inspection swaths is scanned along an x-axis direction across a plurality of dies,
   the first inspection swath is scanned when the wafer is positioned so that the first direction is parallel to the x-axis direction,
   the second inspection swath is scanned when the wafer is positioned so that the second direction is parallel to the x-axis direction,
   a first image set of the plurality of image sets comprises images of dies arranged along the first direction in the wafer, and
   a second image set of the plurality of image sets comprises images of dies arranged along the second direction in the wafer.

3. The method of claim 2, wherein producing the plurality of reference images comprises selecting, from each image set of the plurality of image sets, an image of a reference die that is pre-selected from the plurality of dies.

4. The method of claim 2, wherein producing the plurality of reference images comprises:
   selecting, from each image set of the plurality of image sets, images of a plurality of reference dies that are pre-selected from the plurality of dies; and
   producing a median image of the images of the plurality of reference dies.

5. The method of claim 2, wherein selecting the plurality of target images comprises selecting, from each image set of the plurality of image sets, at least one target image from the images of the plurality of dies.

6. The method of claim 2, wherein the wafer comprises dies that are each formed under different photolithography process conditions.

7. The method of claim 6, wherein
   the dies arranged along the first direction in the wafer are each formed under different focus conditions, and the dies arranged along the second direction in the wafer are each formed under different exposure conditions.

8. An inspection system, comprising:
   an inspection apparatus that scans a plurality of inspection swaths on a wafer and produces a plurality of image sets each of which is produced from each inspection swath of the plurality of inspection swaths, wherein a first inspection swath of the plurality of inspection swaths extending in a first direction is scanned, and a second inspection swath of the plurality of inspection swaths extending in a second direction crossing the first direction is scanned; and
   a computer that obtains the plurality of image sets from the inspection apparatus and produces a plurality of reference images from the plurality of image sets, respectively,
   wherein the plurality of inspection swaths are scanned in an x-axis direction and scanned at different positions arranged along a y-axis direction, wherein the y-axis direction crosses the x-axis direction.

9. The inspection system of claim 8, wherein
   each inspection swath of the plurality of inspection swaths is scanned along the x-axis direction on the wafer across a plurality of dies, and each image set of the plurality of image sets comprises images of the plurality of dies, and the computer selects at least one target image from the images of the plurality of dies in each image set of the plurality of image sets, and detects a defect image from the at least one target image by comparing the at least one target image with a corresponding reference image of the plurality of reference images.

10. The inspection system of claim 9, wherein the at least one target image and the corresponding reference image are images scanned from the same inspection swath.

11. The inspection system of claim 8, wherein each inspection swath of the plurality of inspection swaths is scanned along the x-axis direction on the wafer across a plurality of dies, and each image set of the plurality of image sets comprises images of the plurality of dies, and
wherein producing the plurality of reference images from the plurality of image sets comprises driving the computer to select, from each image set of the plurality of image sets, an image of a reference die that is pre-selected from the plurality of dies.

12. The inspection system of claim 8, wherein each inspection swath of the plurality of inspection swaths is scanned along the x-axis direction on the wafer across a plurality of dies, and each image set of the plurality of image sets comprises images of the plurality of dies, and
wherein producing the plurality of reference images from the plurality of image sets comprises:
driving the computer to select, from each image set of the plurality of image sets, images of a plurality of reference dies that are pre-selected from the plurality of dies; and
driving the computer to produce a median image of the images of the plurality of reference dies.

13. The inspection system of claim 8, wherein
the wafer comprises dies that are each formed under different photolithography process conditions,
dies arranged along the first direction in the wafer are each formed under different focus conditions, and dies arranged along the second direction in the wafer are each formed under different exposure conditions, and
the inspection apparatus scans the first inspection swath of the plurality of inspection swaths after aligning the wafer on a stage of the inspection apparatus to arrange the first direction parallel to the x-axis direction.

14. The inspection system of claim 13, wherein the inspection apparatus additionally scans the second inspection swath of the plurality of inspection swaths after rotating the wafer on the stage of the inspection apparatus to arrange the second direction parallel to the x-axis direction.

15. The method of claim 1, wherein the wafer includes dies that are each formed under different photolithography conditions, the method further comprising:
providing an information on defects based on the detected defect image; and
performing a photolithography process for forming a semiconductor integrated circuit on a substrate under a photolithography condition that is selected from the photolithography conditions by using the information on defect.

16. A method of inspecting a semiconductor wafer, the method comprising:
scanning a plurality of inspection swaths on a wafer, including rows of dies, to obtain a plurality of image sets, wherein each image set of the plurality of image sets comprises images of dies;
producing a plurality of reference images from the plurality of image sets, wherein producing the plurality of reference images comprises selecting, from each image set of the plurality of image sets, images of a plurality of reference dies that are pre-selected from the plurality of dies, and producing a median image from the images of the plurality of reference dies, wherein each reference die of the plurality of reference dies is only centrally located in each row of dies;
selecting a target image from each image set of the plurality of image sets; and
comparing the target image from each image set of the plurality of image sets to a reference image of the plurality of reference images to detect a defect from the target image.

17. The method of claim 16, wherein the wafer comprises a plurality of first dies that are each formed under different focus conditions and arranged along a first direction, and a plurality of second dies that are each formed under different exposure conditions and arranged along a second direction perpendicular to the first direction.

18. The method of claim 17, wherein the plurality of first dies are scanned when the wafer is positioned so that the first direction is parallel to an x-axis direction, and the plurality of second dies are scanned when the wafer is positioned so that the second direction is parallel to the x-axis direction.

19. The method of claim 16, wherein the target image and the reference image are images scanned from the same inspection swath.

* * * * *